Nov. 11, 1930.  F. H. WAGNER  1,781,257
DEEMULSIFIER
Filed Aug. 1, 1927
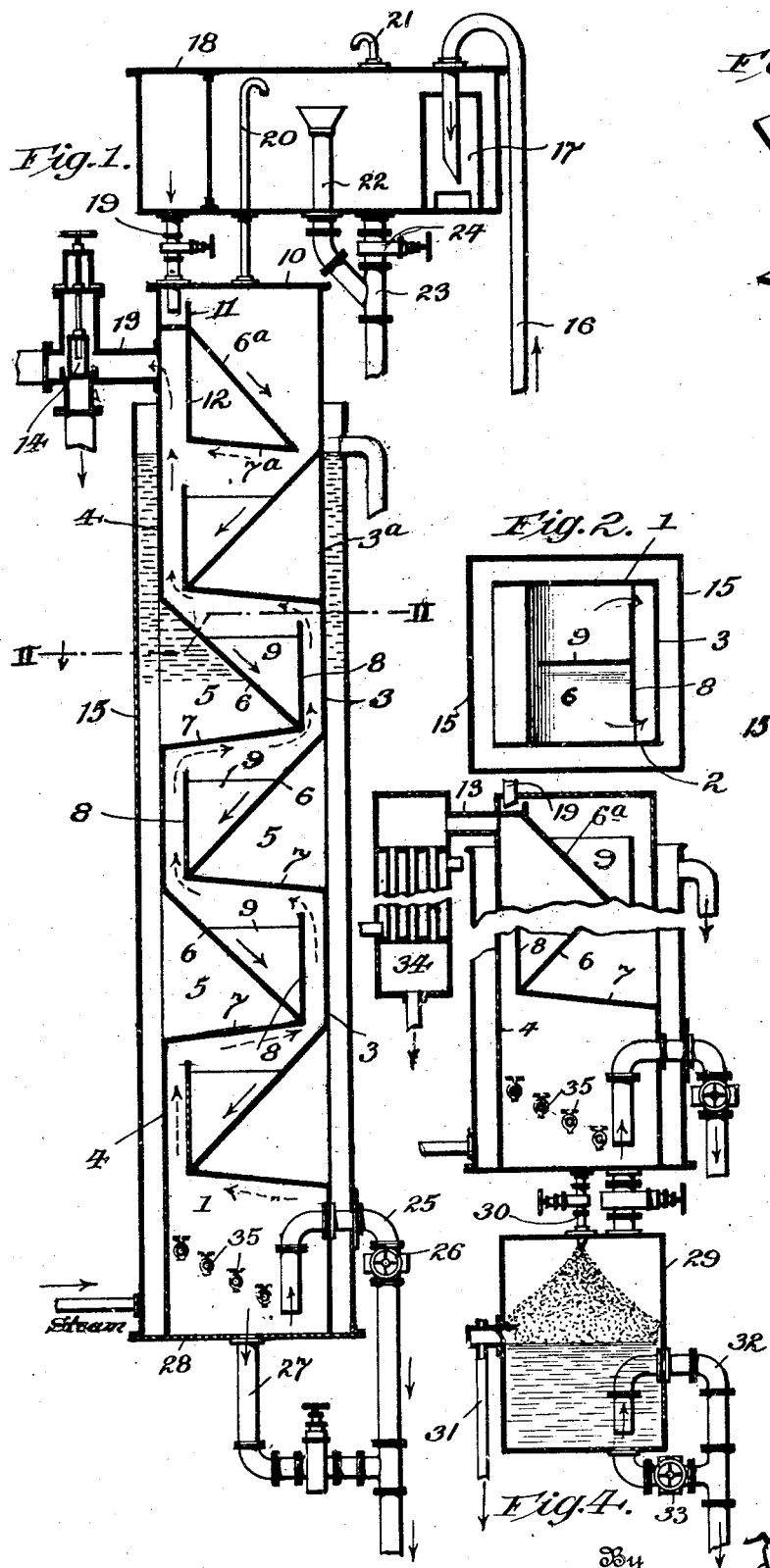
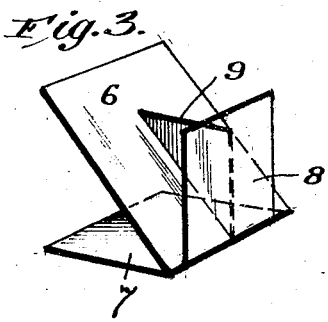
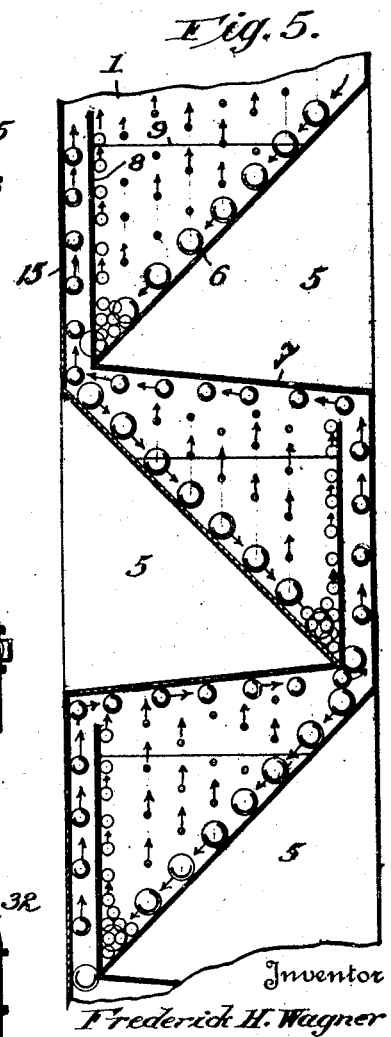
Inventor
Frederick H. Wagner
By Dodge and Sons
Attorneys Patented Nov. 11, 1930

1,781,257

UNITED STATES PATENT OFFICE

FREDERICK H. WAGNER, OF BALTIMORE, MARYLAND, ASSIGNOR TO THE BARTLETT HAYWARD COMPANY, OF BALTIMORE, MARYLAND, A CORPORATION OF MARYLAND

DEEMULSIFIER

Application filed August 1, 1927. Serial No. 209,985.

This invention relates to an improved continuous process of de-emulsification of liquids and to an apparatus for effecting the same.

In the treatment of tars and oily materials, looking toward the separation of water carried thereby, difficulty inheres in breaking down the emulsion so as to free the oil or tar from the water.

An emulsified oil or tar consists essentially of minute particles of water dispersed throughout the oil or tar, or surrounded by a film of oil or tar, the resultant being a globule of almost spherical shape; this shape is due to the surface tension of the oil or tar being of sufficient intensity to overcome the repulsive force of the water, the latter tending to break down this tension, liberate itself, and unite with other globules of water.

These emulsified particles are held in suspension by means of a substance which acts as an emulsifying agent. More carefully defined, an emulsion is a homogeneous mixture of two immiscible liquids, the one liquid being dispersed or scattered in fine globules through the other.

It is therefore obvious that the liquids must be immiscible, otherwise there could be no emulsion. Since oil and water, or tar and water, will not mix, they are ideally suited for producing an emulsion under certain favorable conditions.

There are some emulsions which are readily broken by the application of a moderate degree of heat, and others of such stable character that the heat of evaporation would have to be applied in order to evaporate the one substance from the other.

The main object of the present invention resides in the production of a de-emulsifier wherein the emulsion is broken up as much as possible under the conditions of operation and the lightening of the remaining emulsion (if any) to such a degree that it will rise to the top and pass off with the effluent.

The method and apparatus as hereinafter set forth has been utilized with eminent success upon various materials such as emulsions of tars of various kinds, B. S. and other emulsified materials.

A de-emulsifier embodying my invention is illustrated in the accompanying drawings wherein:

Figure 1 is a vertical sectional view of the apparatus,

Figure 2, a transverse horizontal sectional view taken on the line II—II of Figure 1, Figure 3, a perspective view of one of the units or combined friction plates, Figure 4, a vertical sectional view illustrating a modification of the discharge or lower end of the apparatus, and Figure 5, an enlarged sectional view of a portion of the apparatus wherein the passage of the emulsion and the various oil and water particles or bodies is sought to be illustrated.

Referring to Figures 1 to 3, the main body of the structure may be said to comprise continuous flat side walls 1 and 2 and front and rear walls 3 and 4, these latter in the form of the apparatus shown being interrupted throughout their length by inwardly extending pockets 5.

The pockets on one side are staggered in relation to those on the other and each pocket is defined by an upper inclined plate-like member 6 which stands at an angle of approximately 45° to the vertical and a lower plate 7 which extends inwardly from the adjacent front or rear wall, as the case may be, and is given a slight upward inclination.

Extending upwardly from the line of junction of the members 6 and 7 is a vertically disposed plate 8, the latter being of a width somewhat less than the width of the plates 6 and 7 or, in other words, its side edges terminate short of the side walls 1 and 2 which form closures for the sides of the pocket, as best shown in Figure 2.

As will be seen upon reference to Figure 1, the inclined plates 6 and 7 form in effect continuations of the front and rear walls 3 and 4, respectively. It will also be noted upon reference to said figure that the inclined plates 7 terminate short of the wall of the structure towards which they extend and that the vertically disposed plate 8 stands in spaced relation and substantially parallel to the adjacent wall of the casing, said plate terminating at its upper edge short of the overlying plate 7.

In order to stiffen the structure and maintain the plate 8 in its proper relation to the other elements, I preferably provide a vertically disposed plate 9 which is disposed between the inner face of the plate 8 and the adjacent face of the friction plate 6. The plate 9, by preference, is made of a height somewhat less than that of the plate 8 and is placed centrally of said plates 6 and 8. In addition to stiffening the structure the plate 9 also functions to divide the material passing downwardly through the apparatus to secure an even flow of the material over the various friction plates.

The arrangement above described may be multiplied throughout the height of the apparatus to any desired extent or degree.

At the upper or intake end of the casing, and beneath the closure 10 thereof, I provide an inclined face 6ª which receives the emulsion as it overflows from the spreader trough 11.

Extending from the lower edge of the plate 6ª is a plate 7ª corresponding in function to the plates 7, heretofore described, and extending upwardly from the member 7ª, or at that end opposite its junction with the plate 6ª, is a vertically disposed plate 12. This plate stands adjacent to, and in spaced relation to, the outflow pipe 13 for the effluent, which pipe may be controlled by an adjustable weir 14.

The casing will preferably be surrounded by a shell 15 into which suitable heating medium may be introduced for the purpose of warming or heating the material passing through the de-emulsifier.

The emulsion to be treated passes upwardly through a pipe 16 into an anti-splash tube 17 mounted within the breaker tank 18 which is in communication through a valved pipe 19 with the upper end of the apparatus or, more specifically, said pipe discharges into the spreader trough 11 heretofore mentioned. A suitable vent pipe 20 extends from the upper end of the de-emulsifier into the upper portion of the breaker tank and a vent pipe 21 is also provided in the upper wall of the tank.

An overflow pipe 22 extends upwardly into the tank and opens into the discharge pipe 23, which latter has a valved branch 24 opening into the lower portion of the tank. At its lower end the tank is provided with an inverted draw-off pipe 25 having a valve 26 located therein and a valved drain pipe 27 is also provided, said pipe opening directly from the bottom 28 of the apparatus.

While I have described the pockets 5, or in other words have described a structure wherein the heating liquid or medium can come into close contact with the members 6 and 7, it is, of course, conceivable that the front and rear walls may be continuous and the elements 6 and 7 secured thereto without the formation of any open pockets. Such an arrangement is shown in the upper part of Figure 1 wherein the front wall is extended up past what would be the pocket and such portion of the wall is denoted by 3ª. Such arrangement, however, is not as advantageous as having an open pocket for the reason that the heating medium does not come into direct contact with the friction plates 6 and 7.

From the foregoing it will be seen that there is formed a zigzag or circuitous channel extending from the upper to the lower end of the apparatus and that, where the lower edge of the plate 6 approaches the upper end of the next adjacent similar plate below, there is formed a somewhat restricted passage through which the material is forced under static head.

In Figure 1 I have shown by the solid arrows the course of travel in a downward direction of the emulsion and the heavy material to be separated therefrom and by the dotted arrows have shown the course of the water and emulsion which is not broken down, together with the agents which create emulsion, which passes upwardly through the apparatus.

In Figure 5 I have sought to show graphically the action which takes place in the apparatus and causes a grinding or attrition of the globules of the emulsion as it passes through the apparatus.

The action of the apparatus upon the material is such as to break up the emulsion as much as possible with a consequent reduction of the specific gravity of the remainder of the emulsion to such a degree that it will rise to the top of the apparatus and pass off with the effluent.

Assuming that a tar emulsion is to be acted on, I preferably apply heat of a moderate degree, say 120° F., and introduce the emulsion into the upper end of the apparatus through the valved pipe 19. The material flows from the spreader trough 11 and then downwardly onto the plate 6ª, thence to the underlying inclined plate 6. By reason of the presence of the upstanding plate 8, and the fact that the plate extends well over toward the edges of the plate 6, the material, as it passes downwardly, is forced laterally through the relatively narrow passages at the corners of the friction plates 6.

The heat employed seemingly acts, to a certain extent, to bring additional molecules from the center of the emulsified globule and thus causes it to increase in size with a consequent breaking of the oil film or the lightening of the emulsion in proportion to this increase. When this is effected it becomes highly desirable to separate the remaining emulsified particles, or those which are not broken, from the tar, together with the water which has been liberated. It is here that the action of the friction plates, and the arrangement of the parts above set forth, comes into play.

As the material settles down through the apparatus the particles are caused to crowd close together and thus set up interference between them causing the emulsified particles to break up, the water and lighter materials passing upwardly and the heavier materials, or tar, falling thus effecting the separation by difference in specific gravity. Thus it will be seen that such emulsions as are not readily broken up by the application of a moderate degree of heat, or in other words those which are stable except under the heat of evaporation, may be broken up or disrupted in the apparatus and a separation effected. Stated in another way, the restricted passages which are provided in connection with each of the friction plates 6 squeeze out the lighter emulsion and water from the heavier tar which latter, as above noted, passes to the bottom of the apparatus. The de-emulsifier hence does not only remove the water held in suspension but it also removes the emulsion not broken, together with the greater proportion, if not all, of those agents which create emulsions, and thus prepares the tar in a limpid liquid condition for satisfactory use.

In Figure 5 I have sought to show the action which inheres between the particles as they are crowded together. The larger globules or spheres, indicative of the globules of the emulsion, are shown as passing downwardly over the friction plates 6 to each side of the vertically disposed plates 9 at which point they are crowded outwardly and laterally and come into contact with the up-flowing water and lighter oils. As these emulsified globules pass down over the friction plate they are broken up, to a certain extent, by reason of the frictional action of the plates, and are further disrupted and broken up by the crowding or grinding application which inheres between the globules as they are forced outwardly and downwardly through the restricted passages. The water and lighter oils are shown by the smaller circles with the arrows indicating the movement in an upward direction.

In Figure 4 the lower portion of the apparatus is shown as connected to a settling chamber as 29. The tar passes from the apparatus through an atomizing nozzle 30 so that any water which may be entrained with the tar may be separated therefrom, the tar readily settling and the water passing out through an overflow pipe 31. The tar is drawn off through a pipe as 32 and the chamber 29 may be drained through a valved pipe 33.

As will also be seen upon reference to Figure 4, a condenser 34 is connected to the outlet of the upper end of the apparatus to condense any vapors or oils which may be vaporized through the application of heat to the de-emulsifier.

It will also be seen upon reference to said figure, and likewise Figure 1, that test cocks 35 open into the lower end of the apparatus in order that the attendant may operate the same to determine where the water may be.

What is claimed is:

1. In an apparatus of the character described, the combination of a casing having at its upper end an inlet for the introduction of material to be treated and an effluent outlet, and at its lower end a discharge opening for the recovered material; a series of downwardly inclined plates extending inwardly from two opposite sides of the casing, those on one side being staggered with relation to the other; and a plate extending upwardly from the lower edge of each inclined plate, said upwardly extending plate being narrower at least at its lower edge than the width of the inclined plate and forming with the adjacent walls of the casing restricted passages through which the material undergoing treatment must pass.

2. In an apparatus of the character described, the combination of a casing; a series of downwardly inclined plates extending inwardly from two opposite sides of the casing, those on one side being staggered with relation to the other; a plate extending upwardly from the lower edge of each inclined plate, said upwardly extending plate being narrower at its lower edge than the width of the inclined plate and forming with the adjacent walls of the casing restricted passages through which the material undergoing treatment must pass; and a vertically disposed plate interposed between the upstanding and inclined plates.

3. In an apparatus of the character specified, the combination of a vertically disposed casing, said casing having a series of inwardly extending pockets formed in two of its opposite sides, the upper wall of each pocket being defined by a downwardly inclined plate terminating at its lower end short of the opposite wall, the lower wall of the pocket being defined by an upwardly inclined plate; means associated with the lower end of each of the upper plates for producing a restricted opening through which the liquid undergoing treatment must pass; a jacket surrounding the casing; and means for introducing a heating medium into said jacket whereby the heating medium may enter the open outer ends of the pockets.

4. In an apparatus of the character described, the combination of a vertically disposed chamber substantially rectangular in cross section, two opposite walls of which have openings formed therein, the openings in one wall standing in staggered relation to those in the other; closures for said openings comprising an upper downwardly inclined plate, the lower edge whereof terminates short of the opposite wall, and a bottom plate connected to the lower edge of the upper plate, said bottom plate being given a slight upward inclination; a plate extending upwardly from the inner edge of each of the upper inclined plates and standing in spaced relation to the adjacent wall of the casing, said plate being narrower than the inclined plate; a second vertically disposed plate standing at right angles to the first named vertical plate and extending from the inner face thereof to the upper inclined plate, aforementioned; a shell surrounding the casing; and means for introducing heating medium into the space between the shell and the casing.

5. In an apparatus for de-emulsifying emulsions, the combination of a vertically disposed casing; means for introducing the emulsion into the upper end thereof; a series of downwardly inclined plates extending inwardly from opposite sides of the casing and over which the emulsion flows in its downward travel; a second series of plates arranged below the inclined plates and against which the upflowing materials pass; and a vertically disposed plate extending upwardly from the lower inner edge of each of the first named plates, said last named vertical plates acting to direct the upflowing liquid against the second named plates and likewise forming with the lower edges of the first named inclined plates and the side walls of the casing restricted passages through which the downflowing liquid must pass.

In testimony whereof I have signed my name to this specification.

FREDERICK H. WAGNER.